United States Patent [19]

Hartman, Jr. et al.

[11] Patent Number: 4,461,465
[45] Date of Patent: Jul. 24, 1984

[54] FACSIMILE SHEET FEEDING APPARATUS

[75] Inventors: G. William Hartman, Jr., Longwood; Ronald F. Schley, Ocoee, both of Fla.

[73] Assignee: Exxon Research and Engineering Co., Florham Park, N.J.

[21] Appl. No.: 315,222

[22] Filed: Oct. 26, 1981

Related U.S. Application Data

[63] Continuation of Ser. No. 120,337, Feb. 11, 1980, abandoned.

[51] Int. Cl.³ .............................................. B65H 3/30
[52] U.S. Cl. ..................................... 271/22; 271/121; 271/126
[58] Field of Search ................... 271/21, 22, 121, 122, 271/125, 104, 137, 126

[56] References Cited

U.S. PATENT DOCUMENTS

| | | | |
|---|---|---|---|
| 2,655,374 | 10/1953 | Townsley | 271/125 |
| 3,339,917 | 9/1967 | Petrovsky | 271/122 |
| 3,961,786 | 6/1976 | Yanker | 271/122 |

FOREIGN PATENT DOCUMENTS 55-45058  3/1980  Japan .................................. 271/121

Primary Examiner—Richard A. Schacher
Attorney, Agent, or Firm—Norman L. Norris

[57] ABSTRACT

A facsimile apparatus with a sheet feeding capability to supply sheets of documents and/or copy paper to a rotatable scanning drum. Rollers advance these sheets on a sheet-by-sheet basis along the transport path which includes a plurality of sensors. The drum is positioned so as to receive the sheets prior to scanning and subsequently repositioned after scanning so as to permit these sheets to be removed from the drum.

10 Claims, 14 Drawing Figures

FACSIMILE SHEET FEEDING APPARATUS

This is a continuation of application Ser. No. 120,337, filed 2/11/80, now abandoned.

BACKGROUND OF THE INVENTION

This invention relates to facsimile transmitters and receivers of the type utilized to transmit and receive information-bearing signals representing the dark/light variations on a document located at the transmitter and converting the information-bearing signals to marks or images on a copy medium located at the receiver so as to form a copy which is a reasonable facsimile of the original document.

Most facsimile transmitters and receivers in commercial use at the present time are supplied with document or copy medium sheets by hand. In other words, an operator takes an individual sheet of paper, whether the original document or a blank piece of copy medium, and places that sheet on or in the scanning means of the transmitter or receiver, typically a drum having a clamp for clamping one edge of the sheet.

In some commercially available facsimile equipment, cassettes or magazines are utilized to store into the plurality of sheets prior to feeding to the scanning means. These cassettes include separating members which are inserted between adjacent pairs of sheets so as to assure that each sheet will, with reliability, depart the cassettee or magazine at the appropriate time, i.e., there will be no sticking between the sheets resulting in improper feeding of the sheets to the scanning means. In other commercial facsimile equipment, roll feeders are utilized for the copy medium so as to assure the supply of a fresh copy medium to the scanning means with substantial reliability.

As a general rule, it is difficult to sheet feed, automatically or unattended, a paper of any kind with a high degree of reliability. Paper feeding mechanisms are almost by nature prone to paper jams which result when more than one sheet is feed along a predetermined transport path at any one time. In facsimile application, the problem of reliable sheet feeding becomes even more severe because of the common use of electrosensitive paper in facsimile application. Electrosensitive paper which includes a plurality of layers is characterized by a writing surface which is rather glossy in appearance, and for paper feeding purpose, may be considered almost sticky. Great difficulties inhere in trying to sheet feed a stack of such paper without the use of the above-discussed paper separator cassettes or magazines. Yet, a reliable sheet feeder for a stack of such paper is, in general, preferred to the roll-type feeder previously discussed because of operator convenience.

SUMMARY OF THE INVENTION

It is an overall object of this invention to provide a reliable sheet feeder for a facsimile apparatus.

It is a more specific object of this invention to provide a sheet feeder for a facsimile apparatus which is capable of reliably feeding sheets from a stack of sheets in direct contact with one another without the benefit of separator members.

In the preferred embodiment of the invention and in accordance with the foregoing and other objects, facsimile apparatus comprises scanning means adapted to scan and improve sheet transport means. The sheet transport means includes sheet storage means adapted to receive a stack of sheets. Scuff roller means are adapted to contact the sheets in the stack and move the sheets into a transport path. Transport roller means are adapted to move one of the sheets into the transport path where one of the rollers is adapted to contact one of the sheets on one side of the path and another of the rollers is adapted to contact the sheet on the other side of the path. Means drive the transport rollers at different speeds so as to accelerate one sheet with respect to another sheet when two sheets are simultaneously located between the transport rollers.

In the preferred embodiment, the scuff roller means and one of the rollers on the one side of the path contact the same side of the sheets. Both the one roller and the other roller, while rotating at different speeds, rotate in the same direction at the area of contact with these sheets. The one roller which contacts the same side of the sheet as the scuff roller means rotates at a greater speed than the other roller which contacts the opposite side of the sheets.

The preferred embodiment of the invention also comprises a movable support means for supporting the stack of sheets in contact with the scuff rollers means regardless of the number of sheets in the stack. The movable support means comprises a plate means and elevating means contacting the plate means so as to force the plate means toward the scuff roller means. The elevator means includes an arm mounted for pivotal motion about a pivot point with a portion of the arm contacting the support plate and spring bias means maintaining a portion of the arm in contact with the support plate.

The preferred embodiment further comprises a corner separator means engaging at least one corner of the uppermost sheet in the stack. The corner separator means extend over the stack and along the leading edge of the uppermost sheets in the stack in at least one corner of the stack.

BRIEF DESCRIPTION OF THE DRAWINGS

FIG. 1A is a sectional view of FIG. 1 a short time later in the feeding sequence;

DETAILED DESCRIPTION OF A PREFERRED EMBODIMENT

Figure 1:
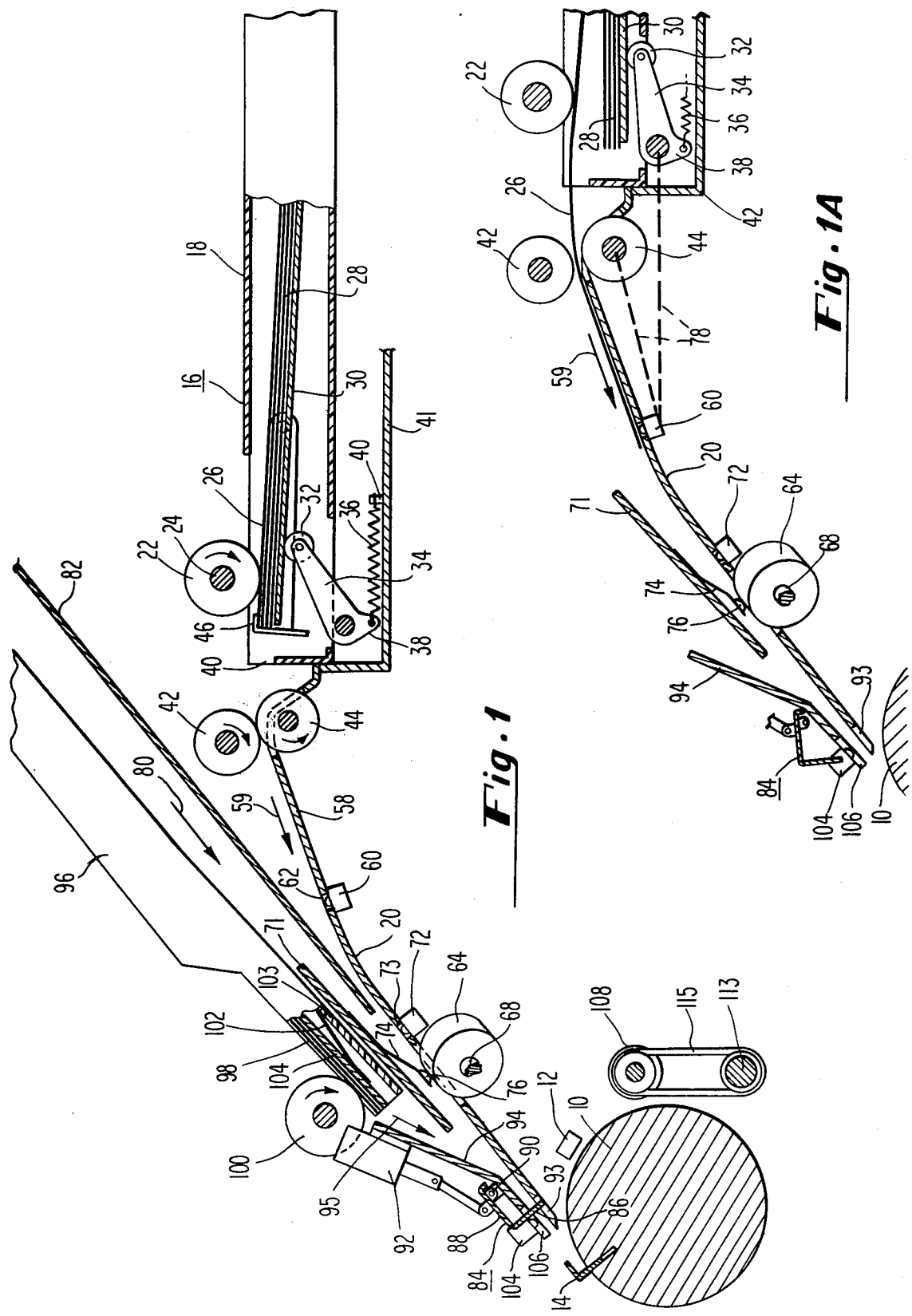
FIG. 1 is a sectional view through a facsimile transceiver apparatus representing a preferred embodiment of the invention.

Referring to FIG. 1, a preferred embodiment of the invention comprises a facsimile transceiver capable of transmitting and receiving information-bearing signals representing dark/light variations on a document. The transceiver includes a sheet scanning means comprising a drum 10 juxtaposed to a scanning head 12. The drum 10 is adapted to rotate about the drum axis as the head 12 moves in a direction parallel with the drum axis so as to scan a sheet carried by the drum in a helical fashion such that the sheet is scanned on a line-by-line basis. The drum 10 includes a clamp 14 shown in the open position which is adapted to receive the leading edge of a sheet and clamp the leading edge against the drum 10. As the drum 10 rotates, the sheet is wrapped around the drum 10.

In accordance with this invention, improved sheet transport means are provided including a sheet storage means 16 adapted to store a stack of sheets in a bin or cassette 1B. In accordance with the invention, means are provided to reliably feed sheets from the cassette 18 along a transport path 59 to the drum 10.

This reliability in sheet feeding from the cassette 18 is achieved in part by the use of a scuff roller means 22 mounted on a rotating shaft 24 which is adapted to engage the leading edge of the topmost sheet 26 in a stack 28 as shown in FIG. 1.

As shown in FIG. 1, the stack 28 is elevated to a position such that the topmost sheet 26 is engaged by the roller means 22 by virtue of a plate 30 which, at the forwardmost area is supported by a roller 32 rotatably mounted on a spring biased lever 34. Spring bias is provided by a spring 36 which is attached to an arm 38 and a peg 40 mounted on the base 41 of the sheet storage means 16.

As also shown in FIG. 1, the topmost sheet 26 is maintained in contact with the scuff roller 22. As the scuff roller 22 rotates, the topmost sheet 26 is forced forward out of the cassette 18 at an opening 40. Rollers 42 and 44 which will now be described in detail are located immediately in front of the opening 40.

In accordance with this invention, the rollers 42 and 44 are driven so as to rotate in the same direction at the sheets 26 as the upper roller 42 engages the topside of the sheets 26 and the lower roller 44 engages the bottomside of the sheets. In accordance with one important aspect of this invention, the rollers 42 and 44 are driven at different speeds with the topmost roller 42 rotating at a faster speed, i.e. angular velocity than the lowermost roller 44. Preferably, the roller 42 is driven at 2.5 to 3.66 times the velocity that the roller 44 is driven. In those instances where two sheets 26 are inadvertently fed through the rollers 42 and 44, the topmost sheet will be accelerated with respect to the lowermost sheet thereby separating the two sheets. This separation is, in most instance earlier achieved by utilizing corner separators 46 in the forwardmost location of the stack of sheets 26 which will be described in substantially more detail with reference to FIGS. 8–10.

Figure 8:
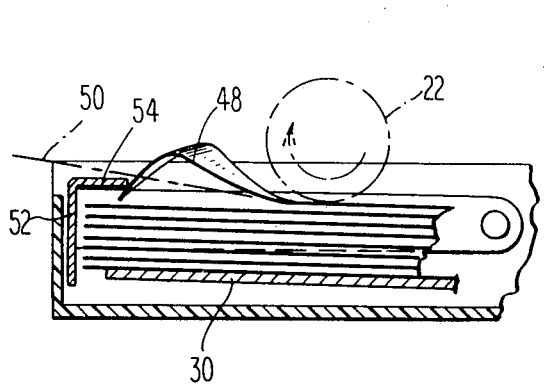
FIG. 8 is an enlarged view of a portion of the sheet storage area shown in FIG. 1 taken along line 8—8 of FIG. 9.
Figure 9:
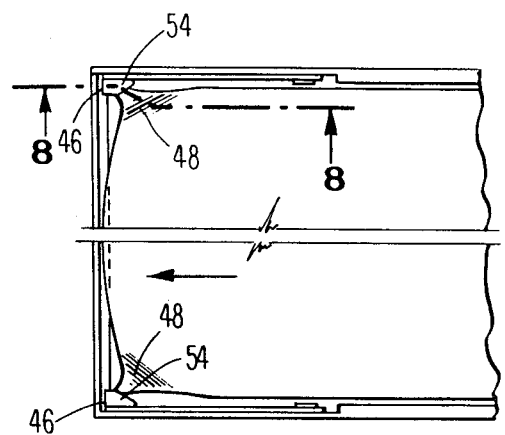
FIG. 9 is a planned view of the sheet storage area shown in FIG. 1.
Figure 10:
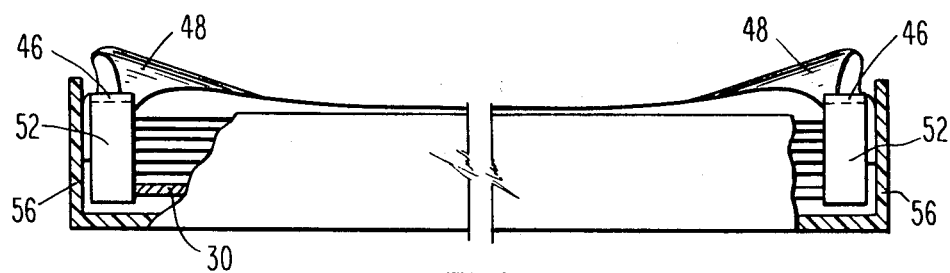
FIG. 10 is a partial sectional view of the front of sheet storage area shown in FIG. 9.

As shown in FIGS. 8—10, a pair of corner separators 46 are located in the forwardmost area of the cassette 18 so as to engage the corners of the uppermost sheets in the stack 28. As the scuff roller 22 moves the topmost sheet 26 forward, the leading edge of the sheet 26 begins to buckle as shown in FIG. 8. Ultimately, the buckling region 48 of the sheet 26 rides over the corner separator 46 as depicted by the dotted line 50. At that time, the topmost sheet 26 is free to advance outwardly toward the rollers 42 and 44.

In order to properly serve the corner separating function, the corner separators 46 include a forwardmost vertical section 52 and an upper horizontal section 54. It will be readily appreciated that the vertical section 52 restrains the forward movement of the topmost sheets 26 in the stack 28 except for the topmost sheet 26 which begins to buckle in the area 48 as shown in FIG. 8. As the scuff roller 22 continues to drive the topmost sheet 28, the buckling region 48 will finally clear the section 54. However, under some circumstances, the topmost sheet 26 as well as the sheet beneath may ride over the corner separator 46. This of course will result in the feeding of two sheets by the scuff roller 22 simultaneously. However the differential speeds of the rollers 42 and 44 will accelerate the top sheet with respect to the sheet immediately beneath so as to assure a single sheet fed to the drum 10. As shown in FIG. 10, the size of the sheets 26 and the stack 28 are restrained by vertical guides 56. The guides 56 also serve to support the corner separators 46.

Referring now to FIG. 1A, the sheet 26 is advanced along a downwardly inclined slide 58 forming a path 59 by the movement of the rollers 42 and 44. In accordance with the invention of copending application Ser. No. 120,461 filed Feb. 11, 1980, now abandoned, the individual sheets 26 are transported down the incline 58 under the force provided by the rollers 42 and 44 until such time as the feeding is interrupted so as to prelocate the sheets 26 in the position shown in FIG. 2 short of the drum 10. This prelocating of the sheets is necessary in order to maintain the individual sheets in a state of readiness so as to allow feeding to the drum 10 in a very short period alloted by the CCITT Standards, i.e., 3 seconds.

Figure 2:
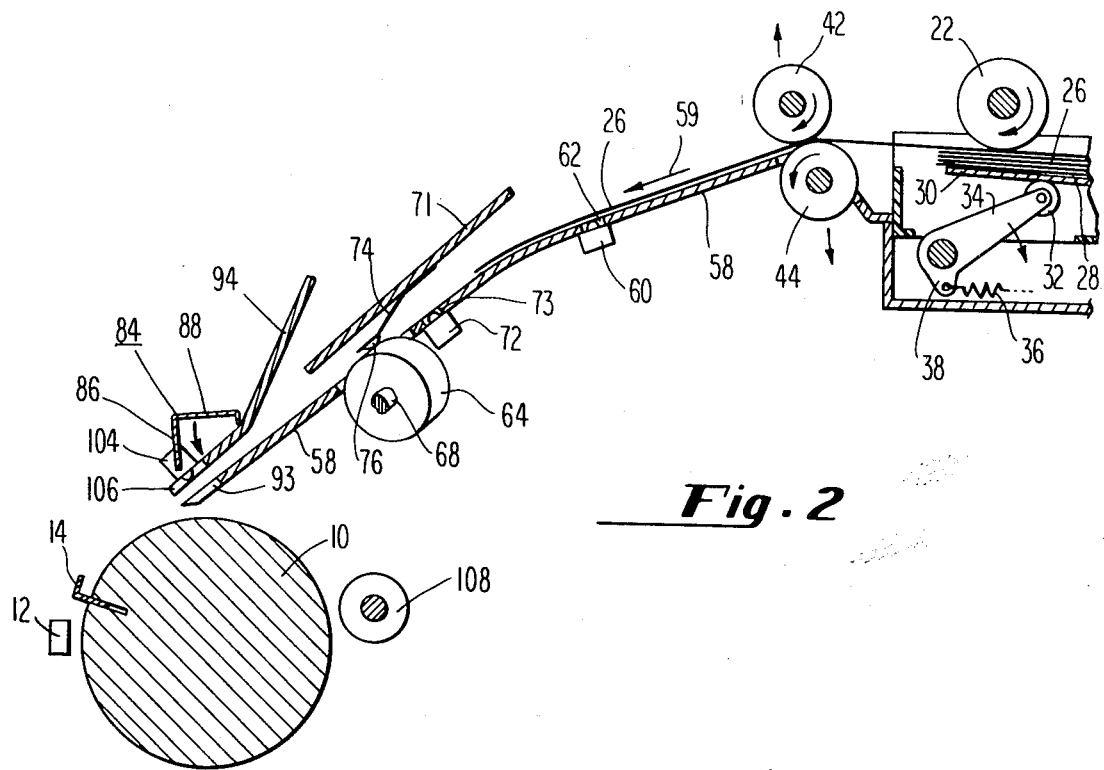
FIG. 2 is a sectional view of FIG. 1A showing the sheet feeding sequence a short time later.

In order to interrupt the feeding of the sheets 26, a sensor 60 is provided in optical communication with the sheet 26 through the guide 58. For this purpose, a small opening 62 in the guide 58 is provided. Upon detection by the sensor 60, the rotation of the rollers 42 and 44 is interrupted and the rollers 42 and 44 are separated to allow the paper to arrive in squaring itself up. The rollers 42 and 44 return to a state of engagement with the sheet 26 as shown in FIG. 2 when a signal is received indicating that the apparatus is ready to receive a facsimile transmission. Rotation of the rollers 42 and 44 is resumed and the sheet is advanced down the inclined guide 58 to the position shown in FIG. 3. However, it will be appreciated that the sheet 26 will be fed to the position shown in FIG. 2 at a time when the drum 10 and the clamp 14 is not prepared to receive the sheet 26. For this reason, the drum 10 is depicted as rotating in FIG. 2, and the clamp 14 is closed. It will also be appreciated that the feeding of the sheet 26 to the position shown in FIG. 2 may occur during the removal of sheet from the drum 10 which will be depicted in more detail in FIG. 7.

Figure 3:
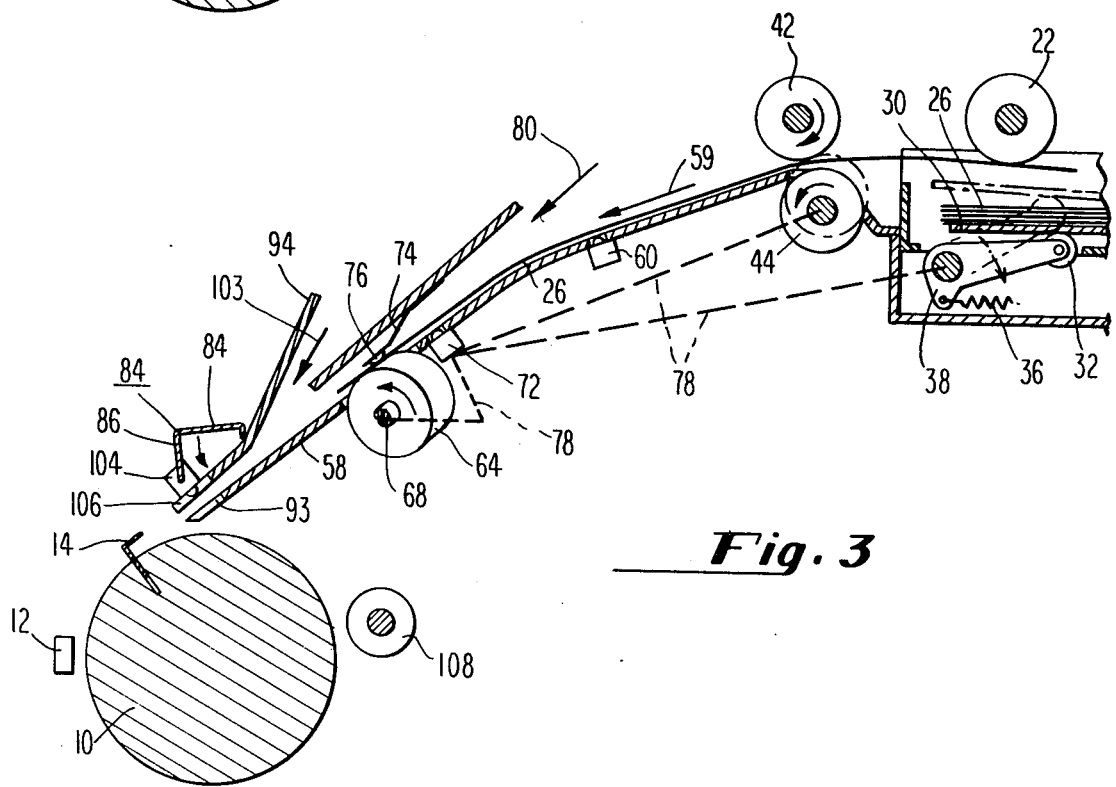
FIG. 3 is a sectional view of FIG. 2 showing the sheet feeding sequence a short time later.
Figure 11:
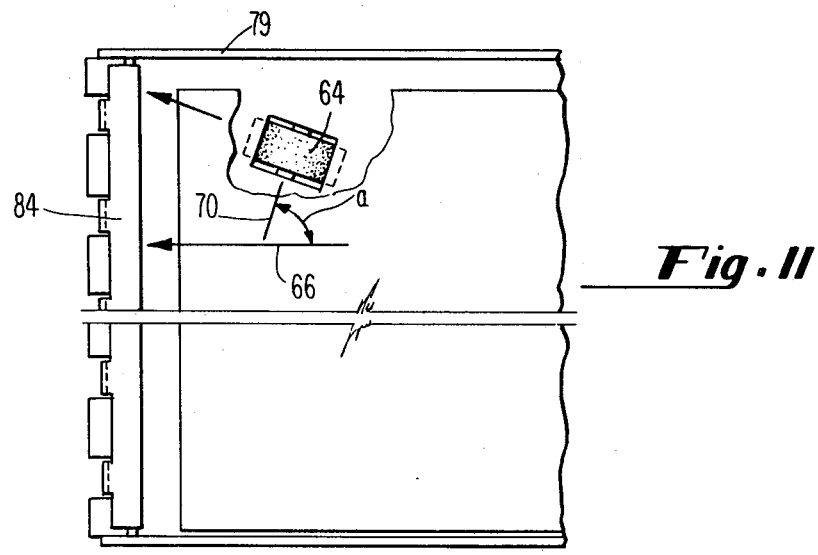
FIG. 11 is a plan view of the document positioning apparatus shown in FIGS. 1 through 4 and 6.

Referring now to FIG. 3, an important aspect of the invention of copending application Ser. No. 120,339 filed Feb. 11, 1980, now U.S. Pat. No. 4,326,222, will now be described. In FIG. 3, the sheet 26 has been advanced along the inclined guide 58 by the rollers 42 and 44 to the point that the sheet 26 is engaged by a forward sheet feed mechanism including a roller 64 which moves the sheet 26 longitudinally along the path established by the guide 26 and laterally with respect to that path. This longitudinal and lateral motion provided by the roller 64 is achieved by mounting the roller 64 on an axis which forms an angle with the longitudinal path of the sheets 26 of less than 90° as shown in FIG. 11. Preferably, the angle a as shown in FIG. 11 lies in the range of 55° to 75° with approximately 72° being preferred. In FIG. 11, the longitudinal path is depicted by a line 66 and the axis of rotation for the roller 64 which coincides with a shaft 68 illustrated in FIG. 3 is depicted by a line 70.

As shown in FIG. 3, the rollers 42 and 44 located rearwardly of the roller 64 are disengaged from the sheet 26. Furthermore, the elevating plate 30 has been lowered by lowering the roller 32 such that the topmost sheet 26 and the stack 28 is not in contact with the roller 22. This prevents any further feeding of sheets 26 and the stack 28 and also permits a sheet 26 in contact with the roller 64 to be moved laterally without restriction by the previous engaged rollers 42 and 44. This disengagement of the roller 42 and 44 and the lowering of the plate 30 is accomplished by the sensing of the forwardmost portion of the sheet 26 by a sensor 72 in an opening 73 located immediately adjacent the roller 64 as depicted by a dotted line 78. When the forward most portion of the sheet 26 is detected by the sensor 72, this disengagement of the rollers 42 and 44 and the lowering of the plate 30 is accomplished. At this point in time, movement of the sheet 26 is controlled solely by the roller 64 in conjunction with a leaf spring 74 mounted on a guide member 71 carrying a contact point 76 which assures good frictional engagement of the sheet 26 by the roller 64 which passes along a path between the contact 76 and the roller 64 as shown in FIG. 3. The sensor 72 also is effective to actuate a roller 64 as depicted by the dotted line 78 in FIG. 11.

As also shown in FIG. 11, the transport path includes a longitudinal guide 79 extending along the longitudinal path depicted by the line 66. When the roller 64 engages the sheet, the sheet is driven toward the longitudinal guide 79 so as to assure that the sheet is properly laterally positioned with respect to the drum 10 and the clamp 14 of the drum as shown in FIG. 11.

In accordance with another important aspect the aforesaid copending application Ser. No. 120,339 filed Feb. 11, 1980 now U.S. Pat. No. 4,326,222, another sheet feed path 80 merges with the path 59 from the cassette 18 previously discussed so as to permit the sheets fed by both paths 59 and 80 to be engaged and laterally positioned by the sheet positioning roller 64. In this regard, reference is made to FIG. 1 wherein a path 80 is provided by an inclined guide 82 for hand feeding of single sheets to the roller 64. In this regard, it will be appreciated that the hand feeding relies upon gravity to move the sheets along the guide 82 in the direction indicated by the sheet transport arrow 80. Once the sheets moving along the path 80 as well as the sheet moving from the cassette 18 along the path 59 are engaged by the roller 64, the sheets remain under the control of that roller to laterally position the sheets against the guide 78 shown in FIG. 11 while moving the sheets forward to the drum 10.

Figure 6:
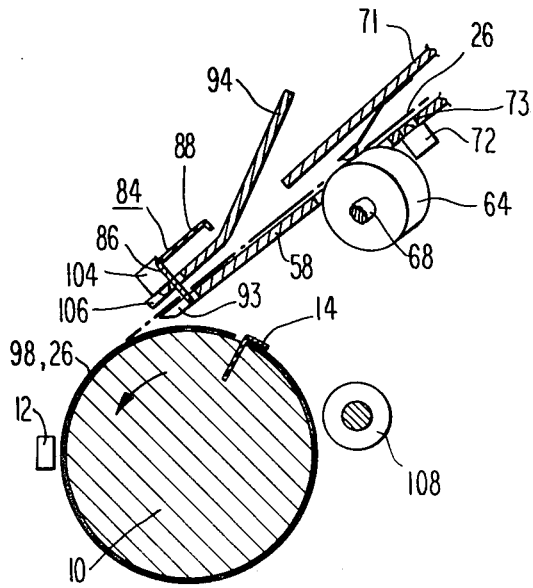
FIG. 6 is a sectional view of a portion of the apparatus shown in FIGS. 1 through 4 a short time later in the sheet feeding sequence.
Figure 7:
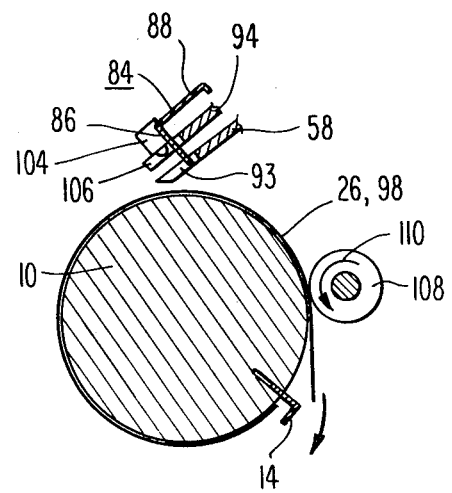
FIG. 7 is a sectional view similar to FIG. 6 a short time later in the sheet feeding sequence.

In accordance with another important aspect of copending application Ser. No. 120,339 filed Feb. 11, 1980 now U.S. Pat. No. 4,326,222, a gate 84 is located down stream of the roller 64 as shown in FIGS. 1-3. The gate 84 as shown in FIGS. 1 and 6 is adapted to close so as to hold back sheets which are fed toward the drum 10 until the proper time for feeding the sheets to the drum 10. Note the sheet shown in phantom against the gate 84 in FIG. 1. The gate 84 is principally used in conjunction with the single-sheet feed path 80 for the following purpose. Where it is desirable to have sheets 26 ready to be fed to the drum 10 just as soon as the drum 10 is ready to receive the next sheet 2 the gate may be moved to the closed ppsition as shown in FIGS. 6 and 7 so as to permit an operator to feed a sheet along the single-sheet feed path 80 in advance of the time in which the drum 10 is ready to receive the sheet, i.e., while the sheet on the drum is still being scanned. This assures that the sheet is ready to be placed on the drum 10 just as soon as the clamp 14 is in the position shown in FIGS. 1-3. Of course, by virtue of the canted mounting of the roller 64, sheets which are advanced to the closed gate 84 are properly, laterally positioned with respect to the guide 79.

Figure 4:
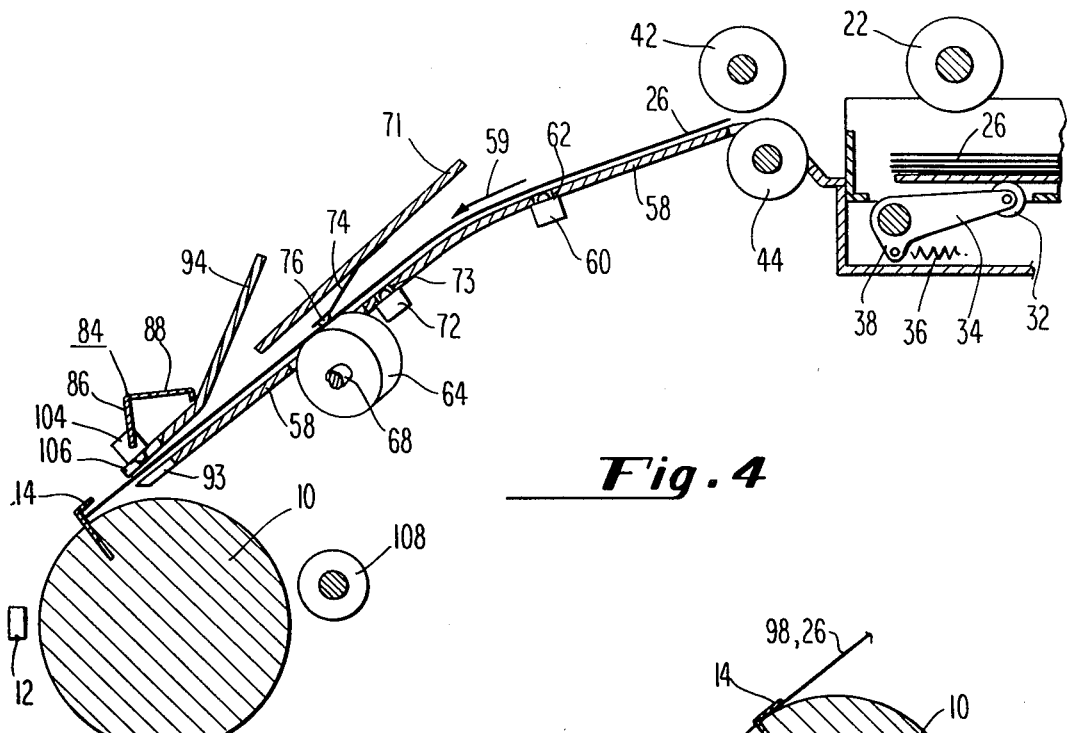
FIG. 4 is a sectional view of FIG. 3 showing the sheet feeding sequence a short time later.
Figure 5:
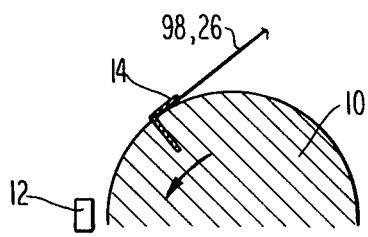
FIG. 5 is a sectional view of the apparatus shown in FIG. 4 a short time later in the sheet feeding sequence.

As shown in FIG. 11, the gate 84 preferably extends along the entire width of each sheet 26. As shown in FIGS. 1, the gate includes an "L" shaped structure having a stop surface 86 and a connective arm 88. The arm 88 is free to pivot about a point 90 in response to the actuation of a solenoid 92. The solenoid 92 is mounted on a supporting surface 94 which defines yet another feed path which will be described subsequently. Then the solenoid 92 is retracted as shown in FIGS. 2-4, the stop surface 86 of the gate 84 is open. When the solenoid 92 is in the extended position, the gate 84 rotates about the pivot point 90 so as to place the stop surface 86 in the closed position extending through an opening 93 in the guide 58.

From the foregoing, it will be understood that a sheet 26 as shown in FIG. 6 is fed to the gate 84. While the sheet 26 is against the gate 84, another sheet 26 located on the drum 10 as shown in FIG. 6 is being scanned by the rotational motion of the drum 10 and the movement of the scanning head 12. Once the sheet 26 located on the drum 10 is removed from the drum as depicted in FIG. 7, the drum 10 is free to rotate to a position such that the open clamp 14 is aligned with the feed path adjacent the gate 84. Only at this time will the gate 84 be moved to the open position so as to allow the sheet 26 under the control of the roller 64 to advance into the clamp 14. Once the sheet 26 is on the drum 10 the gate 84 may again be closed and await receipt of the next sheet 26 fed to the gate 84 by the operator with the assistance of the roller 64.

Referring again to FIG. 1, another sheet feed path 95 is provided from yet another cassette 96. The cassette 96 is inclined and located above the single sheet feed path 80 and the multisheet storage area 16. The cassette 96 also includes a multisheet capacity. In order to individually feed the sheets 98 from the cassette 96, a scuff roller 100 engages the sheets 98 near the leading edge. The uppermost sheet 98 is held in contact with the scuff roller 100 by means of a leaf spring 102 mounted on a plate 103 which forces a plate 104 upwardly toward a scuff roller 100. The sheets from a cassette 96 are driven downwardly under the influence of the roller 100 along the support member 94 toward the drum 10.

It will therefore be appreciated that there are three separate sheet feed paths to the drum 10 although the last-mentioned feed path does not pass the roller 64. Accordingly, the sheets 98 are not subject to the lateral positioning, and it is, therefore, important that the cassette 96 be properly contructed so as to reliably permit the removal of the sheets 98 from the cassette 96 in the appropriate lateral position. This may be accomplished by utilizing, for example, plastic separator sheets between the sheets 98 having openings through the separator sheets so as to permit engagement of a roller 100 with each individual sheet 98 in accordance with prior art practices. Of course, it will be appreciated that the plastic separator sheets will provide low resistance to movement of the sheets 98 from the cassette 96.

In accordance with copending application Ser. No. 120,317 filed Feb. 11, 1980, now U.S. Pat. No. 4,317,138, another sensor 104 located adjacent an opening 106 is shown in FIGS. 1-4. The sensor 114 is utilized in connection with the circuitry as described in detail in the aforesaid copending application Ser. No. 120,317 filed Feb. 11, 1980 now U.S. Pat. No. 4,317,138 , which is incorporated herein by reference. The sensor 104 and associated circuitry detects the variable length of sheets moving along transport paths 95 and 80 which merge in advance of the sensor 104.

Therefore, in order the remove the sheets from the clamp 14, it becomes necessary to engage the sheets at or near the trailing edge of the sheet. This requires the position of the trailing edge of the sheet to be known so that the drum 10 can be rotated to a position such that the sheet removing means in the form a roller 108 as shown in FIGS. 1-4, 6 & 7 is appropriately positioned with respect to the trailing edge of the sheet 26. More particularly, as shown in FIG. 7, the drum 10 must be rotated to a position such that the trailing edge is juxtaposed to the roller 108. Except for rotational motion indicated by an arrow 110 and as provided by a motor driven pulley 113 and a belt 115 as shown in FIG. 1 and slight motion toward the drum 10, this roller 108 is stationary, i.e. the roller 110 does not move peripherally around the drum 10.

As shown in FIG. 6, the sheet 26 is being scanned by the head 12 as the drum 10 rotates. At the conclusion of scanning, the drum is automatically rotated to a rest position such that the trailing edge 111 is located adjacent the roller 108 as shown in FIG. 7. The roller 108 is then moved into a position of engagement with the sheet 26 and rotation begins as depicted by the arrow 110 so as to strip the sheet 26 from the drum 10. Throughout this period of time, the gate 84 is shown as closed so as to prevent the feeding of sheets onto the drum 10 since the drum 10 is not in a position to receive sheets due to the nonalignment of the clamp 14 with the various transport feed paths 59, 80 and 95.

Figure 12:
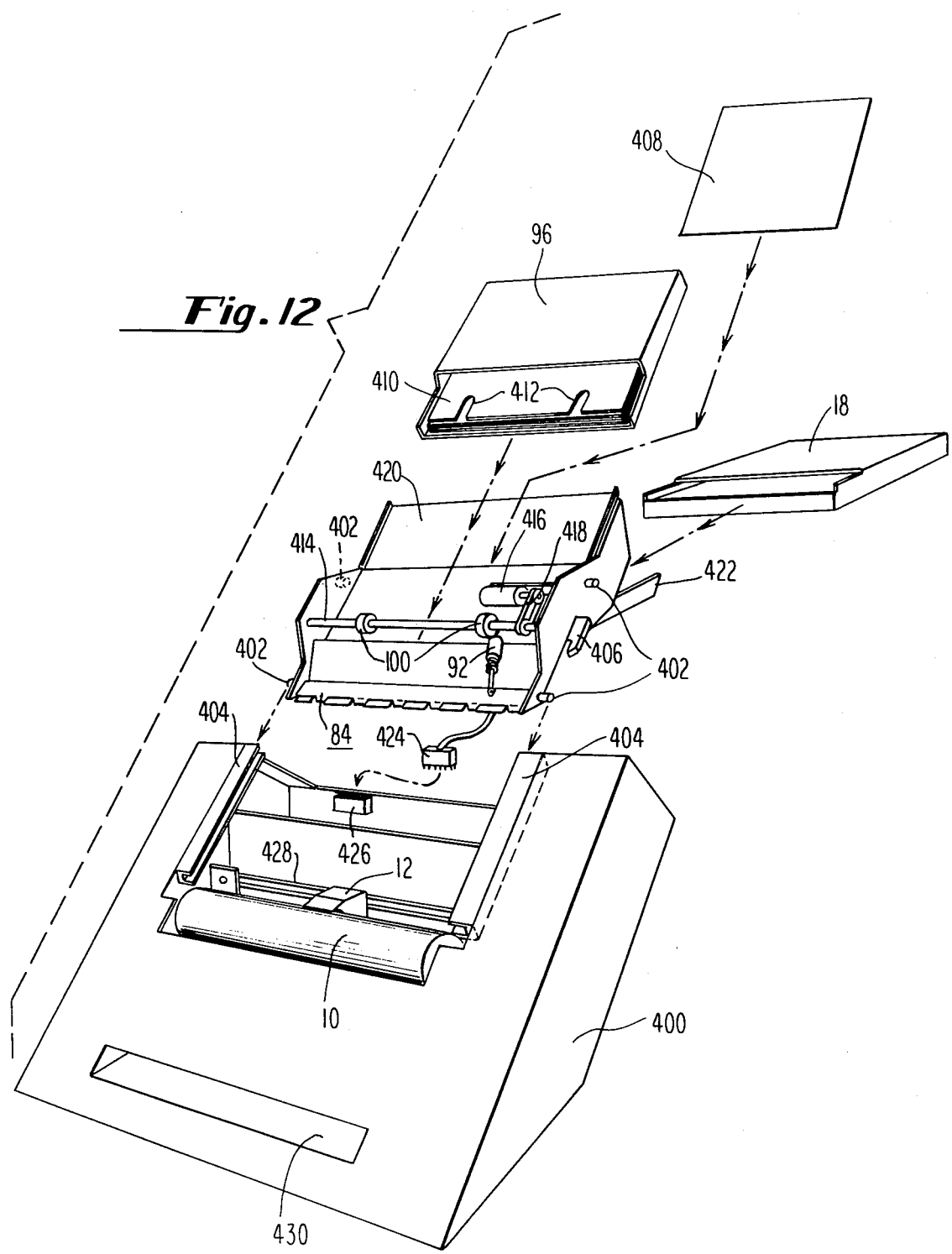
FIG. 12 is an exploded perspective view of the equipment incorporating the apparatus of FIG. 1.

Referring to FIG. 12, an important aspect of copending application Ser. No. 120,462 filed Feb. 11, 1980, now abandoned is disclosed, in particular, the separable nature of the feed mechanism shown in FIGS. 1 through 7 from a base unit 400 in which the drum 10 and the head 12 are mounted.

It will be appreciated that the sheet feeding mechanism is entirely separable from the base unit 400 which is adapted to receive pins 402 of the sheet feeding mechanism in tracks 404. An interlock mechanism including a can 406 is adapted to interact with a switch mounted adjacent the track 404 but not shown in FIG. 12.

The separable nature of the cassette 18 and the cassette 96 from the sheet feeding mechanism is also illustrated in FIG. 12. A sheet 408 adapted to be fed on a single sheet-by-sheet basis as also shown in FIG. 12.

The cassette 96 is shown as clearly comprising separator sheets 410 having elongated openings 412 adapted to receive the rollers 100 which are mounted on a shaft 414. A motor 416 drives the shaft 414 by a belt 418. The cassette 96 may be readily inserted into the sheet feeding mechanism along a guide surface 420. Similarly, the cassette 18 may be loaded into the feed mechanism along a guide means 42 only partially shown.

Prior to sliding the pins 402 into the tracks 404 of the base 400, the feed mechanism is interconnected with the base unit by means of a plug 424 which is received by a jack 426. The base unit 400 also includes a head drive mechanism comprising a belt 428. The belt 428 is moved by means of a head motor not shown so as to produce a linear scanning motion along the drum 10. After the head 12 has scanned the drum 10 and the sheet on the drum 10 is stripped in accordance with this invention, the sheet exits the base unit 400 through an elongated opening 430.

Figure 13:
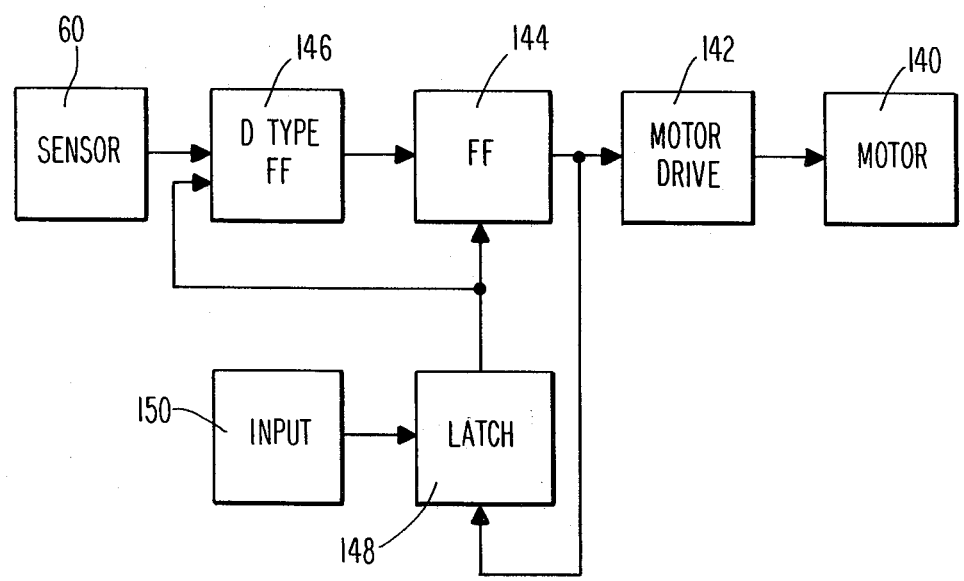
FIG. 13 is a block diagram of a motor control circuit for controlling the feed mechanism of FIGS. 1 through 7.

Reference will now be made to FIG. 13 for a discussion of the control of the roller 22 and the roller 42 and 44 in response to the sensing of a sheet by the sensor 60. A motor 140 drives the roller 22 and the roller 42 and 44 in response to the output of a motor drive circuit 142 which is under the control of a flip-flop 144. The input to the flip-flop 144 is connected to the output of a "D" type flip-flop 146. The flip-flop 144 is reset by a latch 148 which also serves as the data input to the flip-flop 146. The "D" type flip-flop 146 is strobed by the sensor 60.

In response to an input signal from an input circuit 150, the latch 148 goes high and the flip-flop 144 is reset so as to enable the motor drive circuit 142 which in turn results in the rotation of the rollers 22, 42 and 44. The motor 140 continues to run until such time as the sensor 60 generates a positive-going pulse which triggers the "D" type flip-flop 146 to set the flip-flop 144 and disables the motor drive 142 the same time of setting the latch 148. At this time, the sheet 26 as shown in FIG. 2 remains stationary.

When the input circuit 150 generates another signal such as that from a remote transmitter indicating that it is time to reset the transport of the sheet 26, the latch 148 is again set resulting in the resetting of the flip-flop 144. This enables the motor drive 142 which energizes the motor 144 and rotates the rollers 22, 42 and 44. This advances the sheet 26 clear of the sensor 60 so as to produce a negative-going pulse. However, the "D" type flip-flop 146 is not responsive to the negative-going pulse.

It will be appreciated that the control circuit shown in FIGS. 13 may be modified. One modification would be the use of a microprocessor suitably programmed in place of discrete logic circuitry.

Although a particular embodiment of the invention has been shown and described it will be appreciated that various modifications may be made which will occur to those of ordinary skill in the art without departing from the true spirit and scope of the invention.

What is claimed is:

1. Facsimile apparatus comprising scanning means adapted to scan a sheet and improved sheet transport means comprising:
   sheet storage means adapted to receive a stack of sheets;
   corner separater means engaging at least one corner of the uppermost sheet in said stack;
   scuff roller means adapted to contact the uppermost of said sheets in said stack and to move said sheets into a transport path;

at least two transport rollers adapted to move one of said sheets into said transport path, one of said transport rollers adapted to contact one of said sheets on one side of said path and another of said transport rollers adapted to contact said one of said sheets on another side of said path; and means for positively driving each transport roller such that said one transport roller rotates in a first rotational direction and said another transport roller rotates in a second rotational direction, said one transport roller also rotating at a different peripheral speed from said another transport roller so as to accelerate one sheet with respect to another sheet when two sheets are simultaneously located between said transport rollers.

2. The facsimile apparatus of claim 1 wherein said scuff roller means and said one of said rollers contact the same side of said sheets.

3. The facsimile apparatus of claim 1 further comprising movable support means for maintaining a sheet in said stack in contact with said scuff roller means.

4. The facsimile apparatus of claim 3 wherein said support means comprises a plate means in contact with the lowermost sheet in said stack.

5. The facsimile apparatus of claim 4 further comprising elevator means contacting said plate means and forcing said plate means upwardly.

6. The facsimile apparatus of claim 5 wherein said elevator means comprises a pivotally mounted arm having a portion contacting said plate and bias means for pivoting said arm such that said portion contacts said plate.

7. The facsimile apparatus of claim 6 wherein said transport rollers move in the same direction at the area of contact with said sheet.

8. The facsimile apparatus of claim 7 wherein said one of said transport rollers rotates at a greater speed than the other of said rollers.

9. The facsimile apparatus of claim 1 wherein said corner separator means extends over said stack and along the leading edge of the uppermost sheets in said stack in said at least one corner.

10. The facsimile apparatus of claim 1 wherein said first and said second rotational direction are such that the direction of motion of the periphery of each of said transport rollers at the nip thereof is the same direction as the direction of motion of said sheets in said transport path.

* * * * *